United States Patent
Goldsberry

(10) Patent No.: US 7,603,740 B2
(45) Date of Patent: Oct. 20, 2009

(54) SPATULA FOR CLEANING CYLINDRICAL CONTAINERS

(75) Inventor: Robert Goldsberry, Lafayette, IN (US)

(73) Assignee: N-Vent, Inc., Lafayette, IN (US)

( * ) Notice: Subject to any disclaimer, the term of this patent is extended or adjusted under 35 U.S.C. 154(b) by 341 days.

(21) Appl. No.: 10/964,083

(22) Filed: Oct. 13, 2004

(65) Prior Publication Data

US 2006/0075591 A1   Apr. 13, 2006

(51) Int. Cl.
  *A47L 13/02* (2006.01)
(52) U.S. Cl. .............. 15/236.07; 15/236.09; 15/236.05; 294/49; 30/172
(58) Field of Classification Search .............. 15/236.01, 15/236.05, 236.06, 236.07, 236.09, 56–58, 15/70, 75; D7/688; D32/40, 46, 49; 294/49, 294/55; 30/169, 172
See application file for complete search history.

(56) References Cited

U.S. PATENT DOCUMENTS

| | | | |
|---|---|---|---|
| 1,434,744 A | * 11/1922 | Hibbler | ........................ 30/169 |
| D132,043 S | * 4/1942 | Trollen | ........................ D32/49 |
| 2,489,606 A | * 11/1949 | Allen | ............................ 294/7 |
| 4,627,128 A | 12/1986 | Shea | |
| 4,987,635 A | 1/1991 | Young | |
| 5,491,868 A | 2/1996 | Baggenstos | |
| 5,491,869 A | * 2/1996 | Sullivan et al. | ............... 15/245 |
| 5,706,546 A | 1/1998 | Utley | |
| 5,799,997 A | * 9/1998 | Lehn et al. | .................... 294/55 |
| 5,875,515 A | 3/1999 | Dallas | |

* cited by examiner

*Primary Examiner*—Laura C Guidotti
(74) *Attorney, Agent, or Firm*—Dowell Baker, P.C.

(57) ABSTRACT

The spatula of the present invention is designed to effectively clean and remove residual paint from the inside walls and bottom of a cylindrical paint container. The spatula includes a blade with a protrusion with a curved edge extending from the blade. In the preferred embodiment, the protrusion is located adjacent to but set back from the straight distal edge of the blade so that the distal edge of the blade can be effectively used to scrape residual paint from the bottom of a container. The side edges of the blade form a right angle with the distal edge so that the distal corners of the blade may be used to clean paint from the hard to reach circumferential corner at the bottom of a cylindrical container. Finally, the curved edge of the protrusion may be effectively used to scrape residual paint up the sides and out of the cylindrical container.

13 Claims, 1 Drawing Sheet

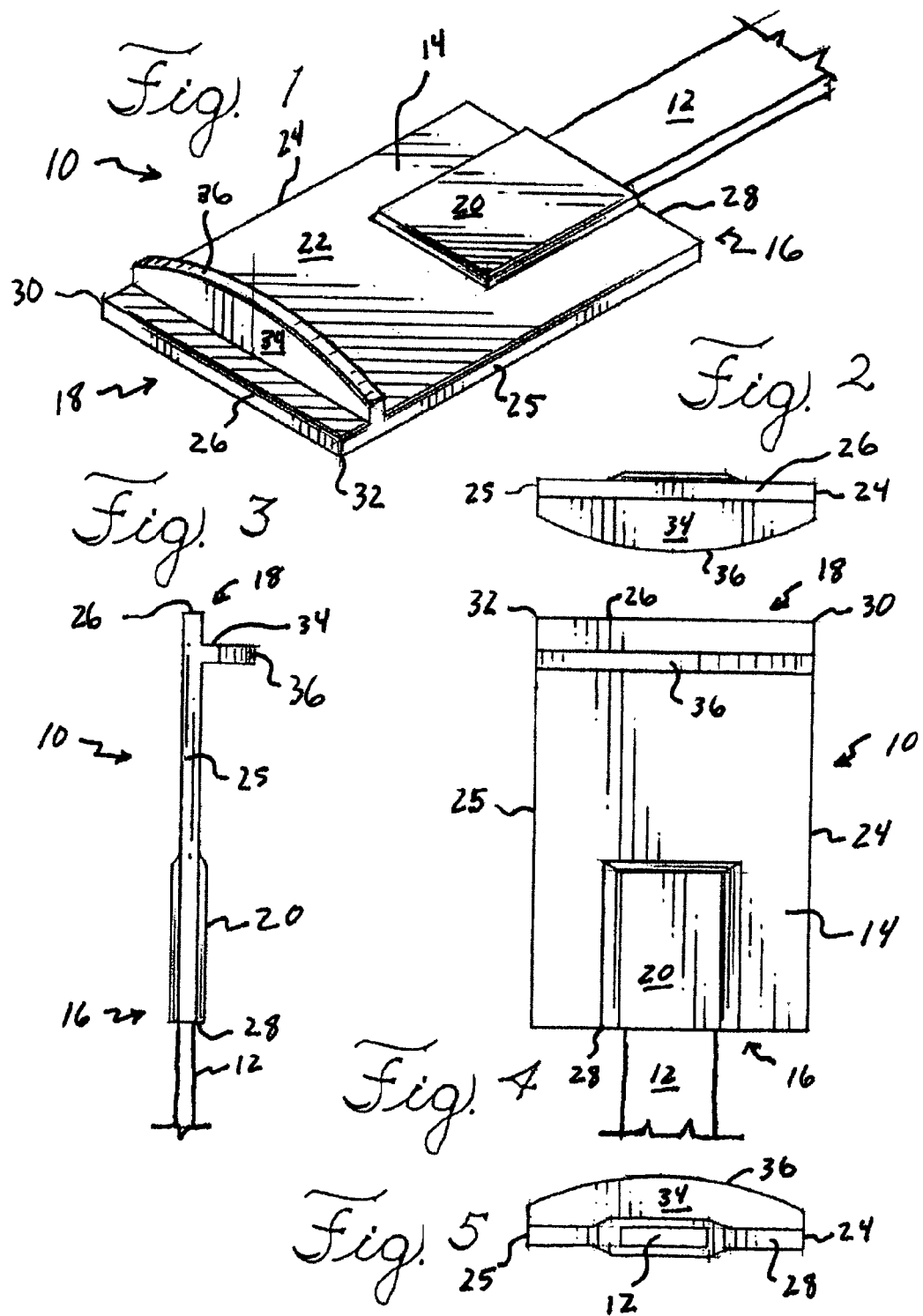

SPATULA FOR CLEANING CYLINDRICAL CONTAINERS

FIELD OF THE INVENTION

The present invention relates to cleaning utensils, and more specifically to spatulas for recovering liquid from empty containers.

BACKGROUND OF THE INVENTION

Although a container of paint or other highly viscous liquid may appear empty, the container may actually have a significant volume of material adhering to the inside walls and bottom of the container. An apparently empty pint can of paint may actually contain 1-3 ounces of paint remaining in the can. An apparently empty quart can of paint may actually contain 3-4 ounces of paint. High volume custom painting operations, such as auto body shops, go through many pints and quarts of paint in a single day. If the residual paint in the apparently empty paint cans is not salvaged and reused, this wasted paint may represent a significant and unnecessary expense.

Nevertheless, many people will simply discard an apparently empty container of paint or other highly viscous liquid. In many cases, the individual does not realize the significant volume of material left in the container. In other cases, the individual does not wish to take the time and trouble of scraping the residual paint from the container. Accordingly, many have sought to simplify and expedite the process of recovering residual paint and other liquids from a nearly empty container.

Various scrapers, scoops and spatulas have been proposed for removing residual viscous liquids from a container. For example, U.S. Pat. No. 4,627,128 issued to Shea discloses a scoop that can be used to scrape the sides of a container and collect the residual liquid in the scoop. The curved bottom edge of the scoop, which matches the curvature of the inside wall of a container, can be used to remove residual liquid from the side of the container. The scoop, however, cannot effectively and simply clean the bottom of the container. The scoop also suffers from the disadvantage that residual paint will collect in the curved inner portion of the scoop, which must itself be cleaned of residual material. The scoop is also overly complicated in design for its intended purpose.

U.S. Pat. No. 4,987,635 issued to Young also discloses a tool with a protrusion with a curved edge that matches the curvature of the inside wall of a container. This trowel, however, is rigid in structure and does not provide the benefits of a conventional flexible spatula. The trowel also suffers from the same deficiency of being unable to effectively clean the bottom of a container.

U.S. Pat. No. 5,491,868 issued to Baggenstos and U.S. Pat. No. 5,875,515 also disclose tools that attempt to effectively clean a container. These tools, although offering the benefits of a flexible spatula, do not provide a curved portion that matches the curvature of the inside wall of a container. Thus, these tools provide no means for effectively collecting the residual liquid on the side of the container or for scooping the liquid from the container.

Accordingly, it is an object of the present invention to provide a tool that can effectively clean and remove residual paint and other viscous material from the curved sides of a container.

A further object of the present invention is to provide a tool that can effectively clean and remove paint and other viscous material from the flat bottom of a container.

Another object of the present invention is to provide a tool with the flexible attributes of a conventional spatula, although improved in performance and design.

A still further object of the present invention is to provide a tool that is easy to clean of residual paint that collects on the tool.

Finally, an object of the present invention is to provide a tool that is economical to manufacture, simple in design and refined in appearance.

SUMMARY OF THE INVENTION

The preferred embodiment of the present invention provides a spatula that effectively cleans and removes residual paint from the inside walls and bottom of a cylindrical paint container. The spatula includes a blade with a protrusion with a curved edge extending from the blade. The protrusion is located adjacent to but set back from the straight distal edge of the blade so that the distal edge of the blade can be effectively used to scrape residual paint from the bottom of a container. The side edges of the blade form a right angle with the distal edge so that the distal corners of the blade may be used to clean paint from the hard to reach circumferential corner at the bottom of a cylindrical container. Finally, the curved edge of the protrusion may be effectively used to scrape residual paint up the sides and out of the cylindrical container.

The preferred embodiment of the present invention offers the advantages of improving the paint collecting and removal capabilities of a conventional spatula, while also maintaining the benefits of a flexible spatula. The present invention can effectively remove paint from the sides, bottom and the bottom circumferential corner of a cylindrical paint can. The present invention is also simple in design, and therefore easy to clean and economical to manufacture. These and other advantages will become apparent as this specification is read in conjunction with the accompanying drawings and appended claims.

BRIEF DESCRIPTION OF THE DRAWINGS

FIG. 1 is a perspective view of the improved spatula of the present invention.

FIG. 2 is a top view of the improved spatula of the present invention.

FIG. 3 is a side view of the improved spatula of the present invention.

FIG. 4 is a front view of the improved spatula of the present invention.

FIG. 5 is a bottom view of the improved spatula of the present invention.

DETAILED DESCRIPTION

FIG. 1 shows an improved spatula 10 of the present invention. The spatula 10 includes a blade 14 and an elongated handle 12 attached to the proximal end 16 of the blade 14. The handle 12 and blade 14 are made from materials resistant to corrosion and dissolution from paints and other liquids sold in cylindrical containers that the spatula 10 may be used to clean. The blade of the present invention is preferably molded from a flexible polypropylene or polyethylene material, although other chemically resistant materials may be used in the construction of the present invention.

The handle 12 is preferably rigid and of a sufficient length to allow the blade 14 to be inserted into a cylindrical container without the hand holding the handle 12 coming into contact with the material in the container. The handle 12 may be attached to the blade 14 by molding the blade around the end of the handle, or molding the blade with an orifice so that the handle may be inserted into the blade and securely attached to the blade. Other means for attaching the blade to the handle will be readily apparent to those of skill in the art. The handle 12 and blade 14 may also be molded as a unitary piece.

The blade 14 includes a proximal end 16 where the blade 14 is attached to the handle 12 and a distal end 18 remote from the handle 12. In the preferred embodiment, the blade 14 includes a raised portion 20 at the distal end 18 where the blade 14 is attached to the handle 12. The blade 14 is substantially rectangular in shape with a flat portion 22 bounded by a straight first side edge 24, a straight second side edge 25, a straight distal edge 26 and a proximal edge 28. The first side edge 24 forms substantially a right angle with the distal edge 26 at the first distal corner 30. The second side edge 25 forms substantially a right angle with the distal edge at the second distal corner 32. The longitudinal axis of the blade 14 runs from the distal edge 26 to the proximal edge 28 of the blade and the transverse axis of the blade 14 runs from the first side edge 24 to the second side edge 25 of the blade.

The blade 14 also includes a protrusion 34 running from the first side edge 24 to the second side edge 25 that extends at substantially a right angle from the flat portion 22 of the blade. The protrusion 34 is located adjacent and parallel to the distal edge 26 of the blade 14, but set back from the distal edge 26 a predetermined distance. The protrusion 34 includes a curved edge 36 that is preferably curved to match the curvature of the inside of a cylindrical container that is to be cleaned by the spatula 10.

The blade 14 is manufactured of a material that, in addition to being resistant to corrosion and dissolution from paints and chemical solvents used to clean paints, is also substantially flexible. Accordingly, the blade 14 is sufficiently flexible so that it will bend about the transverse axis of the blade. However, due to the reinforcing properties of the protrusion 34 at the distal end 18 of the blade 14, as well as the additional material in the raised portion 20 at the proximal end 16 of the blade, the blade 14 is less flexible and less subject to bending about the longitudinal axis. As described below, these properties provide additional benefits when the spatula 10 is used to clean the inside of a cylindrical container.

Although not shown in the Figures, the working edges of the blade may also be tapered slightly to improve the performance of the spatula. Thus, rather than being square edges as shown in the Figures, first side edge 24, second side edge 25, distal edge 26 and curved edge 36 may taper slightly to a round or square edge.

The spatula 10 of the present invention is designed for the cleaning of residual paint from the inside of cylindrical paint containers. With the spatula 10 held vertically and either side edge 24 or 25 placed along the side of the container, the side edge of the blade 14 can be moved around the circumference of the inside of the container to collect residual paint on the sides of the container and allow it to drip to the bottom of the container.

The straight distal edge 26 may then be used to scrape the collected paint, as well as residual paint on the bottom of a container. The straight distal edge 26 conforms to the straight planar bottom of the container and substantially all of the residual paint on the bottom of the container can be scraped together and collected on one side of the container.

In addition, with the distal edge 26 placed on the bottom of the container and either side edge 24 or 25 placed on the side of the container, the corresponding distal right angle corner 30 or 32 of the blade 14 conforms to the right angle formed by the sides and the bottom of the container. In this position, the blade 14 can be moved around the circumference of the bottom of the walls of the container to collect the difficult to reach residual paint in the circumferential corner at the bottom of the container.

Finally, the curved edge 36 of the protrusion 34 may be used to scrape any last residual and/or collected paint from the bottom and sides of the container. Because the blade 14 is flexible and bends along its longitudinal axis, the distal edge 26 may be placed on the bottom of the container and the blade 14 flexed so that the protrusion 34 extends forward from the blade 14 to conform with the circumferential corner between the bottom and sides of the container. In this position, the blade 14 can be pulled out of the container so that the protrusion 34 collects any collected or residual paint in the circumferential corner and along the side of the container.

Preferably, the radius of the curved edge 36 of the protrusion 34 matches the radius of the side of the container so that the curved edge 36 precisely conforms to the curve of the inside of the container. This feature enables all of the residual paint on the side of the container to be collected on the blade 14 and removed from the container.

The design of the present invention offers many advantages. The straight side edges 24 and 25, along with the relative stiffness of the blade 14 about its longitudinal axis, enable the blade 14 to effectively scrape and collect paint from the sides of the container. The straight distal edge 26 enables the blade 14 to effectively scrape and collect paint from the bottom of the container. The flexibility of the blade 14 about its transverse axis allows the protrusion 34 with its curved edge 36 to be effectively used to scrape and collect paint from the circumferential corner between the sides and bottom of the container. The curved edge 36 of the protrusion 34 is also effective for scraping and collecting paint from the curved sides of the container.

The clean lines and simple construction of the present invention also offer many advantages. When using the spatula 10, collected paint may be easily shaken and/or scraped from the blade 14 into a receptacle. The blade 14 is also economical to manufacture, with a minimum amount of blade material needed to perform the desired functions of the present invention.

These and other advantages will be come readily apparent to those of skill in the art when the specification is read in conjunction with the accompanying claims.

Although the present invention is predominately described for use with paints, the benefits of the present invention may also be realized when used to clean containers of other viscous liquids and semi-solids including oil, grease, foods, syrup, liquid adhesives, chemicals and others.

Other alterations, variations and combinations are possible that fall within the scope of the present invention. Although the preferred embodiment of the present invention has been described, those skilled in the art will recognize other modifications that may be made that would nonetheless fall within the scope of the present invention. Therefore, the present invention should not be limited to the apparatus described. Instead, the scope of the present invention should be consistent with the invention claimed below.

What is claimed is:

1. A flexible residual paint scraper for removing residual paint from both a cylindrical surface and a bottom surface of a paint container, the scraper comprising:
   a handle;
   a substantially flat blade attached to an end of the handle, the blade having a proximal end adjacent the handle and a distal end remote from the handle;

the blade further having a distal edge at the distal end of the blade, the plane of the blade including at least two unique distal points along on the distal edge and at least one proximal point adjacent to the proximal end;

a protrusion extending from the blade at substantially a right angle to the plane of the blade and extending across the blade parallel to the distal edge of the blade, the protrusion being located adjacent to the distal edge of the blade but set back from the distal edge a predetermined distance;

the blade having a flat surface located in the plane of the blade between the protrusion and the handle, the flat surface extending across the blade parallel to the distal edge of the blade;

the protrusion further having a curved edge, wherein a chord of the curved edge is parallel to the transverse axis of the blade.

2. The scraper of claim 1 wherein the blade is flexible.

3. The scraper of claim 2 wherein the blade further includes a straight side edge running from the proximal end of the blade to the distal end of the blade, the straight side edge and the distal edge meeting at substantially a right angle.

4. The scraper of claim 1 wherein the blade further includes a straight side edge running from the proximal end of the blade to the distal end of the blade, the straight side edge and the distal edge meeting at substantially a right angle.

5. A flexible automotive paint can scraper designed for removing an automotive paint residue from a cylindrical container, the scraper comprising:

a handle;

a flexible blade attached to an end of the handle, the blade having a substantially flat surface, a proximal end adjacent the handle and a distal end remote from the handle;

the blade further including a straight first side edge running from the proximal end of the blade to the distal end of the blade, a second side edge and a straight distal edge, the straight first side edge and the straight distal edge meeting at substantially a right angle;

the straight first side edge, second side edge, and the straight distal edge each adapted for scraping the automotive paint residue from inside the cylindrical container;

a protrusion located at the distal end of the blade and extending from the flat surface of the blade, the protrusion having a substantially flat first portion and a substantially flat second portion, both portions extending at substantially a right angle perpendicular to the blade, the flat first portion facing generally towards the straight distal edge of the blade, and the flat second portion facing generally towards the handle.

6. The scraper of claim 5 wherein the protrusion is set back from the distal edge of the blade a first distance, the blade has a paint collection surface extending from the distal edge of the blade to the protrusion.

7. The scraper of claim 6 wherein the protrusion further includes a rounded edge.

8. The scraper of claim 6 wherein the length of the first distance is a tenth the length of the straight first side edge.

9. The scraper of claim 5 wherein the protrusion further includes a rounded edge.

10. The scraper of claim 5 wherein the protrusion extends from the blade at substantially a right angle to the flat surface of the blade and runs across the blade parallel to the distal edge of the blade, the protrusion being located adjacent to the distal edge of the blade but set back from the distal edge a predetermined distance, the protrusion separated from the distal edge by a paint collecting surface of the blade;

the protrusion further having a curved edge, wherein a chord of the curved edge is parallel to the transverse axis of the blade.

11. The scraper of claim 5 further comprising the substantially flat surface bounded by the straight first side edge, the second side edge, and the straight distal edge.

12. A flexible, automotive paint removing spatula designed for removing paint from a cylindrical surface and a bottom surface inside of a cylindrical container, the spatula comprising:

a handle;

a substantially flat blade attached to an end of the handle, the blade having a proximal end adjacent the handle, a distal end remote from the handle, a longitudinal axis running from the proximal end to the distal end of the blade and a transverse axis running across the blade perpendicular to the longitudinal axis;

the blade further being substantially flexible about the transverse axis of the blade;

the blade further being substantially rectangular in shape and bounded by a proximal edge, a straight first side edge parallel to the longitudinal axis of the blade adapted for removing paint from inside the cylindrical container, wherein paint is defined to be a highly viscous liquid inside the cylindrical container, a straight distal edge parallel to the transverse axis of the blade and forming a first right angle corner with the straight first side edge, and a straight second side edge parallel to the longitudinal axis of the blade and forming a second right angle corner with the straight distal edge;

the blade further having a protrusion extending from the blade perpendicular to the first right angle corner and running from the first side edge to the second side edge of the blade parallel to the distal edge of the blade, the protrusion being located adjacent to the distal edge of the blade but set back from the distal edge a predetermined distance;

the protrusion further having a curved edge, wherein a chord of the curved edge is parallel to the transverse axis of the blade; and the blade further having a planar surface located between the protrusion and the handle, the planar surface extending from the second side edge to the straight first side edge.

13. The scraper of claim 12 further comprising the protrusion being entirely located adjacent to the distal edge of the blade.

* * * * *